United States Patent
Hardas et al.

(10) Patent No.: US 11,580,083 B2
(45) Date of Patent: Feb. 14, 2023

(54) SCORING MEMBERS OF A SET DEPENDENT ON ELICITING PREFERENCE DATA AMONGST SUBSETS SELECTED ACCORDING TO A HEIGHT-BALANCED TREE

(71) Applicant: Spigit, Inc., San Francisco, CA (US)

(72) Inventors: Manas Hardas, Fremont, CA (US);
Lisa Purvis, Pleasanton, CA (US);
James Gardner, Oakland, CA (US);
Kate Bennet, San Francisco, CA (US)

( * ) Notice: Subject to any disclaimer, the term of this patent is extended or adjusted under 35 U.S.C. 154(b) by 392 days.

(21) Appl. No.: 16/706,045

(22) Filed: Dec. 6, 2019

(65) Prior Publication Data

US 2020/0192879 A1 Jun. 18, 2020

Related U.S. Application Data

(62) Division of application No. 15/025,862, filed as application No. PCT/US2013/062757 on Sep. 30, 2013, now Pat. No. 10,545,938.

(51) Int. Cl.
*G06F 16/00* (2019.01)
*G06F 16/22* (2019.01)
(Continued)

(52) U.S. Cl.
CPC ...... *G06F 16/2246* (2019.01); *G06F 3/04812* (2013.01); *G06F 3/04842* (2013.01);
(Continued)

(58) Field of Classification Search
None
See application file for complete search history.

(56) References Cited

U.S. PATENT DOCUMENTS 5,608,620 A 3/1997 Lundgren
6,466,928 B1 10/2002 Blasko et al.
(Continued)

FOREIGN PATENT DOCUMENTS

GB 2421812 7/2006
WO 0186532 11/2001

OTHER PUBLICATIONS

Donath, Bob "Portfolio Management", ISBM New Product Development Consortium, Mar. 19, 2001.
(Continued)

*Primary Examiner* — Thu Nguyet T Le
(74) *Attorney, Agent, or Firm* — Haynes and Boone, LLP

(57) ABSTRACT

A software voting or prediction system iteratively solicits participant preferences between members of a set, with a binary tree built used to minimize the number of iterations required. As each member of the set is considered, it is pairwise-compared with select members represented by nodes already in the binary tree, with iterations beginning at a root node of the tree and continuing to a leaf node. The newly considered member is placed as a new leaf node, and the tree is height-rebalanced as appropriate. Red-black tree coloring and tree rotation rules are optionally used for this purpose. Yes/no preference tallies are kept for each member of the set throughout the tree-building process and are ultimately used for scoring. Height-rebalancing of the tree helps minimize the number of iterations needed to precisely score each member of the set relative to its alternatives.

20 Claims, 7 Drawing Sheets

(51) Int. Cl.

| | | |
|---|---|---|
| *G06F 16/2457* | (2019.01) | |
| *G06F 16/901* | (2019.01) | |
| *G06F 16/31* | (2019.01) | |
| *G06Q 10/101* | (2023.01) | |
| *G06F 3/04812* | (2022.01) | |
| *G06F 3/04842* | (2022.01) | |
| *G06N 5/022* | (2023.01) | |
| *G06Q 30/0203* | (2023.01) | |
| *H04L 67/02* | (2022.01) | |

(52) U.S. Cl.
CPC ...... *G06F 16/24578* (2019.01); *G06F 16/322* (2019.01); *G06F 16/9027* (2019.01); *G06N 5/022* (2013.01); *G06Q 10/101* (2013.01); *G06Q 30/0203* (2013.01); *H04L 67/02* (2013.01)

(56) References Cited

U.S. PATENT DOCUMENTS

| | | |
|---|---|---|
| 6,473,084 B1 | 10/2002 | Phillips et al. |
| 6,606,615 B1 | 8/2003 | Jennings et al. |
| 6,792,399 B1 | 9/2004 | Phillips et al. |
| 6,795,793 B2 | 9/2004 | Shayegan et al. |
| 6,912,511 B1 | 6/2005 | Eliezer et al. |
| 7,130,777 B2 | 10/2006 | Garg et al. |
| 7,155,510 B1 | 12/2006 | Kaplan |
| 7,236,953 B1 | 6/2007 | Cooper et al. |
| 7,249,077 B2 | 7/2007 | Williams et al. |
| 7,287,013 B2 | 10/2007 | Schneider et al. |
| 7,406,459 B2 | 7/2008 | Chen et al. |
| 7,415,436 B1 | 8/2008 | Evelyn et al. |
| 7,519,562 B1 | 4/2009 | Vander Mey et al. |
| 7,519,564 B2 | 4/2009 | Horvitz |
| 7,542,881 B1 | 6/2009 | Billiotte et al. |
| 7,546,285 B1 | 6/2009 | Baker, Jr. |
| 7,552,076 B1 | 6/2009 | Jenohara et al. |
| 7,555,454 B2 | 6/2009 | Cooper et al. |
| 7,565,313 B2 | 7/2009 | Waelbroeck et al. |
| 7,566,270 B2 | 7/2009 | Amaitis et al. |
| 7,590,554 B2 | 9/2009 | Chen et al. |
| 7,639,868 B1 | 12/2009 | Regli et al. |
| 7,668,773 B1 | 2/2010 | Pruitt |
| 7,672,904 B2 | 3/2010 | Powell |
| 7,707,062 B2 | 4/2010 | Abramowicz |
| 7,716,329 B2 | 5/2010 | Lee et al. |
| 7,742,968 B2 | 6/2010 | Guler et al. |
| 7,742,972 B2 | 6/2010 | Lange et al. |
| 7,761,441 B2 | 7/2010 | Chung |
| 7,773,538 B2 | 8/2010 | Wang et al. |
| 7,805,518 B1 | 9/2010 | Kamvar et al. |
| 7,818,394 B1 | 10/2010 | Lawler et al. |
| 7,865,418 B2 | 1/2011 | Jenohara et al. |
| 7,880,741 B2 | 2/2011 | Proebsting et al. |
| 7,974,904 B2 | 7/2011 | Frischer |
| 7,996,296 B2 | 8/2011 | Lange |
| 8,229,324 B2 | 1/2012 | Berg et al. |
| 8,112,515 B2 | 2/2012 | Ala-Kleemola et al. |
| 8,275,695 B2 | 9/2012 | Lange et al. |
| 8,341,065 B2 | 12/2012 | Berg et al. |
| 8,370,249 B2 | 2/2013 | Lange et al. |
| 8,380,595 B1 | 2/2013 | Fogarty |
| 8,396,777 B1 | 3/2013 | Fine et al. |
| 8,583,470 B1 | 11/2013 | Fine et al. |
| 8,606,618 B2 | 12/2013 | Dabke |
| 8,612,331 B2 | 12/2013 | Hanson et al. |
| 8,788,386 B1 | 7/2014 | Fogarty |
| 8,825,759 B1 | 9/2014 | Jackson et al. |
| 9,159,056 B2 | 10/2015 | Hardas et al. |
| 9,489,636 B2 | 11/2016 | Attenburg et al. |
| 2001/0013009 A1* | 8/2001 | Greening ....... G06Q 10/063112 705/7.29 |
| 2001/0051876 A1 | 12/2001 | Seigel |
| 2002/0038321 A1 | 3/2002 | Keeley |
| 2002/0073009 A1 | 6/2002 | Hogg et al. |
| 2002/0095305 A1 | 7/2002 | Gakidis et al. |
| 2002/0107722 A1 | 8/2002 | Laurin et al. |
| 2002/0138386 A1 | 9/2002 | Maggioncalda et al. |
| 2003/0033191 A1 | 2/2003 | Davies et al. |
| 2003/0074166 A1 | 4/2003 | Jackson et al. |
| 2003/0078829 A1 | 4/2003 | Chen et al. |
| 2003/0182177 A1 | 9/2003 | Gallagher |
| 2004/0002891 A1 | 1/2004 | Chen et al. |
| 2004/0117395 A1 | 6/2004 | Gong |
| 2004/0153456 A1 | 8/2004 | Charnock et al. |
| 2004/0162751 A1 | 8/2004 | Tsyganskiy et al. |
| 2004/0176994 A1 | 9/2004 | Fine et al. |
| 2004/0196839 A1 | 10/2004 | Sahita |
| 2004/0202987 A1 | 10/2004 | Scheuring |
| 2005/0021441 A1 | 1/2005 | Flake et al. |
| 2005/0108120 A1 | 5/2005 | Malka et al. |
| 2005/0114161 A1 | 5/2005 | Garg et al. |
| 2005/0171960 A1 | 8/2005 | Lomet |
| 2005/0228739 A1 | 10/2005 | Leibowitz |
| 2005/0256800 A1 | 11/2005 | Hogg et al. |
| 2006/0117303 A1 | 6/2006 | Gizinski |
| 2006/0122927 A1 | 6/2006 | Huberman et al. |
| 2006/0205483 A1 | 9/2006 | Meyer et al. |
| 2006/0206365 A1 | 9/2006 | Boardman et al. |
| 2006/0224442 A1 | 10/2006 | Round et al. |
| 2007/0067293 A1 | 3/2007 | Yu |
| 2007/0078699 A1 | 4/2007 | Scott et al. |
| 2007/0078756 A1 | 4/2007 | Hogg et al. |
| 2007/0078849 A1* | 4/2007 | Slothouber ......... G06F 16/9535 707/999.005 |
| 2007/0112803 A1 | 5/2007 | Pettovello |
| 2007/0136105 A1 | 6/2007 | Huberman et al. |
| 2007/0136429 A1 | 6/2007 | Fine et al. |
| 2007/0198387 A1 | 8/2007 | Uenohara et al. |
| 2007/0250429 A1 | 10/2007 | Walser et al. |
| 2007/0256093 A1 | 11/2007 | Hiler |
| 2007/0288579 A1 | 12/2007 | Schunemann |
| 2008/0077517 A1 | 3/2008 | Sappington |
| 2008/0109245 A1 | 5/2008 | Gupta |
| 2008/0109491 A1 | 5/2008 | Gupta |
| 2008/0120166 A1 | 5/2008 | Fernandez et al. |
| 2008/0140786 A1 | 6/2008 | Tran |
| 2008/0222191 A1 | 9/2008 | Yoshida et al. |
| 2008/0281610 A1 | 11/2008 | Yoshida et al. |
| 2008/0288209 A1 | 11/2008 | Hunt et al. |
| 2008/0288326 A1 | 11/2008 | Abramowicz |
| 2008/0319825 A1 | 12/2008 | LaComb et al. |
| 2009/0024549 A1 | 1/2009 | Johnson |
| 2009/0073174 A1 | 3/2009 | Berg et al. |
| 2009/0076939 A1 | 3/2009 | Berg et al. |
| 2009/0076974 A1 | 3/2009 | Berg et al. |
| 2009/0094039 A1 | 4/2009 | MacDonald et al. |
| 2009/0157490 A1 | 6/2009 | Lawyer |
| 2009/0182624 A1 | 7/2009 | Koen et al. |
| 2009/0198565 A1 | 8/2009 | Pluschkell et al. |
| 2009/0210282 A1 | 8/2009 | Elenbaas et al. |
| 2009/0254386 A1 | 10/2009 | Wang et al. |
| 2009/0254475 A1* | 10/2009 | Pennock ................. G06Q 20/10 705/1.1 |
| 2009/0313350 A1 | 12/2009 | Hundscheidt et al. |
| 2009/0327054 A1 | 12/2009 | Yao et al. |
| 2010/0005116 A1* | 1/2010 | Yoon .................. H04N 21/454 707/E17.044 |
| 2010/0058249 A1 | 3/2010 | Sarkar et al. |
| 2010/0179930 A1 | 7/2010 | Teller et al. |
| 2011/0137848 A1 | 6/2011 | Stephens |
| 2012/0089617 A1 | 4/2012 | Frey |
| 2012/0130860 A1 | 5/2012 | Suzuki et al. |
| 2012/0130863 A1 | 5/2012 | Tedjamulia et al. |
| 2012/0150585 A1 | 6/2012 | Dabke |
| 2012/0239608 A1 | 9/2012 | Rinearson |
| 2013/0246327 A1 | 9/2013 | Tabrizi |
| 2013/0262193 A1 | 10/2013 | Sundaresan |
| 2013/0290484 A1 | 10/2013 | Anderson |
| 2013/0311455 A1 | 11/2013 | Kritt et al. |
| 2013/0332468 A1 | 12/2013 | Hardas et al. |
| 2013/0346501 A1 | 12/2013 | Hardas et al. |
| 2014/0019557 A1 | 1/2014 | Hardas et al. |

(56) References Cited

U.S. PATENT DOCUMENTS

| | | |
|---|---|---|
| 2014/0025690 A1 | 1/2014 | Tareen et al. |
| 2014/0108426 A1 | 4/2014 | Goldberg et al. |
| 2014/0162241 A1 | 6/2014 | Morgia et al. |
| 2014/0222524 A1 | 8/2014 | Pluschkell et al. |
| 2014/0358720 A1* | 12/2014 | Morales ............. G06Q 30/0631 705/26.7 |

OTHER PUBLICATIONS

Blackman, Ivy et al., "Using Pareto Principle Plus Statistic Methodology in Establishing a Cost Estimating Model", Construction Industry Economics, 2013.
Chou, Jui-Sheng et al., "Probabilistic simulation of developing likelihood distribution of engineering project cost", Automation in Construction 2009.
Day, Jacqueline et al., "A Generic Toolkit for the Successful Management of Delphi Studies", Electronic Journal of Business Research Methods, 2005.
Jiao, Jianxin et al., "Product portfolio planning with customer-engineering interaction", IIE Transactions, 2005.
Preble, John "The Selection of Delphi Panels for Strategic Planning Purposes", Strategic Management Journal, Jun. 1984.
Shaheen, Ahmed et al., "Fuzzy Numbers in Cost Range Estimating", Journal of Construction Engineering and Management, Apr. 2007.
Sonmez, Rifai "Parametric Range Estimating of Building Costs Using Regression Models and Bootstrap", Journal of Construction Engineering and Management, Dec. 2008.
Addison, Tom "E-commerce project development risks: evidence from a Delphi survey", International Journal of 8 nformation Management, 2003.
Almeida, Daniell, The Relevancy of Group Expertisefor the Accuracy of a Prediction Market, Erasmus School of Economics, May 2010.
Bao, Yong et al., Comparing Density Forecast Models, Journal of Forecasting, vol. 26, 2007.
CFO and Crowdcast Launch Financial Prediction Market, PRWeb, Jul. 16, 2009.
Chen, Kay-Yul et al., Eliminating Public Knowledge Biases in Information Aggregation Mechanisms, HP Laboratories, Mar. 21, 2003.
Chen, Kay-Yul et al., Forecasting Uncertain Events with Small Groups, HP Laboratories, Jun. 25, 2001.
Chen, Kay-Yul et al., Predicting the Future, Information Systems Frontier, vol. 5, No. 1, 2003.
Dubil, Robert, Economic Derivatives Markets-New Opportunities for Individual Investors: A Research Agenda, Financial Services Review, vol. 6, No. 2, pp. 89-104, Summer 2007.
Harnessing Collective Intelligence to Improve Strategic Planning, Crowdcast, While Paper, 2010.
Ledyard, John et al., An Experimental Test of Combinatorial Information Markets, Dec. 2007.
Crowdcastcom web pages, Crowdcast, Jul. 2009.
Marzban, Caren, The ROC Curve and the Area under ii as Performance Measures Weather and Forecasting, vol. 19, 2004.
Myung, In Jae et al., Maximum Entropy Aggregation of Expert Predictions, Management Science, vol. 42, No. 10, Oct. 1996.
Pennock, David M. et al., The Power of Play: Efficiency and Forecast Accuracy in Web Markel Games, NEC Research Institute Report, 2000-168, Feb. 17, 2001.
Plott, Charles R, et al., Information Aggregation Mechanisms: Concept, Design, and Implementation for a Sales Forecasling System, California Institute of Technology, Mar. 2002.
Richards, Erin, "Some districts drop class ranks to improve students' college chances", Sep. 28, 2008.
Schrieber, Jared M., The Application of Prediction Markets to Business, MIT, Jun. 2004.
Ullah, Aman, Entropy, divergence and distance measures with econometric applications, Journal of Statistical Plannin( and Inference, vol. 48, 1996.
Vaughan, J.W., Learning from collective preferences, behavior, and beliefs. {Order No. 3381885, University of Pennsylvania). ProQuest Dissertations and Thesis, 152, 2009.
Wolfers, Justin et al., Interpreting Prediction Market Prices as Probabilities, Jan. 8, 2007.
Wolfers, J., et al., Prediction markets. The Journal of Economic Perspectives, 18(2), 107-126, 2004.
Non-Final Office Action for U.S. Appl. No. 15/025,862 dated Sep. 6, 2018.
Final Office Action for U.S. Appl. No. 15/025,862 dated Feb. 21, 2019.
Advisory Action for U.S. Appl. No. 15/025,862 dated Jun. 10, 2019.
Non-Final Office Action for U.S. Appl. No. 15/025,862 dated Aug. 6, 2019.

* cited by examiner

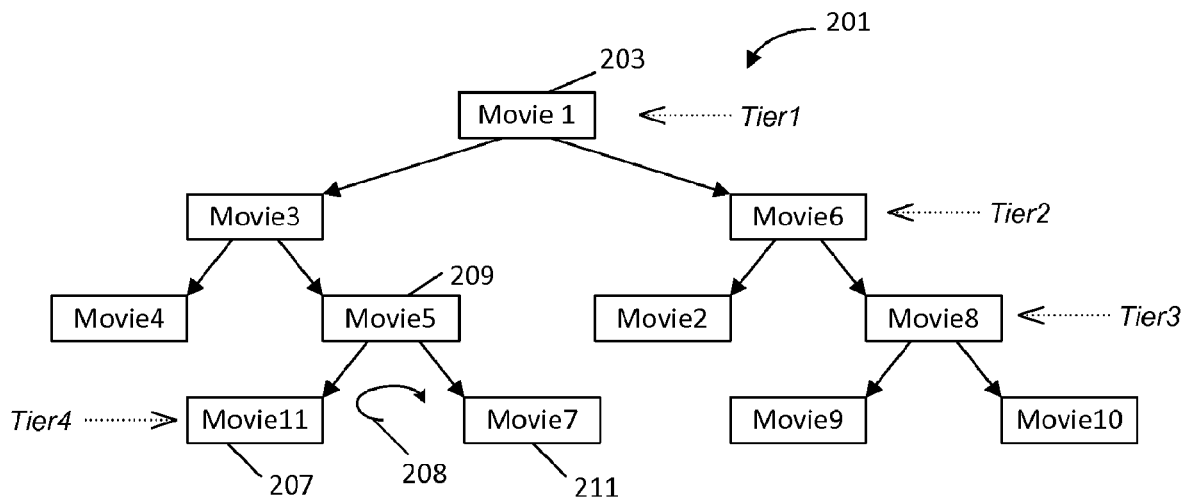
FIG. 2B
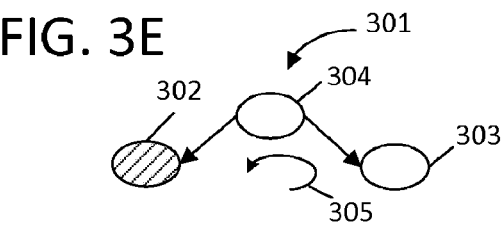
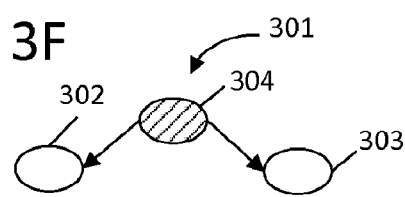
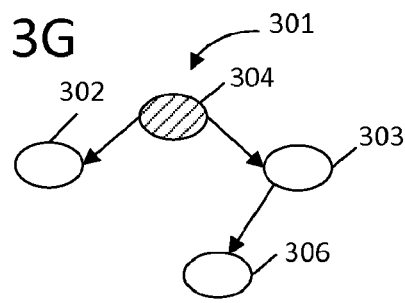

SCORING MEMBERS OF A SET DEPENDENT ON ELICITING PREFERENCE DATA AMONGST SUBSETS SELECTED ACCORDING TO A HEIGHT-BALANCED TREE

PRIORITY CLAIM

This application is a divisional of U.S. patent application Ser. No. 15/025,862 entitled "SCORING MEMBERS OF A SET DEPENDENT ON ELICITING PREFERENCE DATA AMONGST SUBSETS SELECTED ACCORDING TO A HEIGHT-BALANCED TREE" filed on Mar. 29, 2016, which is claims priority to international PCT Application No. PCT/US2013/062757 entitled "SCORING MEMBERS OF A SET DEPENDENT ON ELICITING PREFERENCE DATA AMONGST SUBSETS SELECTED ACCORDING TO A HEIGHT-BALANCED TREE" filed on Sep. 30, 2013, all of which are incorporated by reference herein.

BACKGROUND

A number of applications exist in which it is desired to collect crowd-based scoring of a diverse set of choices. For example, opinion polls can be used to develop predictions for outcomes of sporting events and elections; prediction markets can be used to derive forecasts based on individual behavior expressed through social games, trading of actual or virtual stocks, and other mechanisms. Yet another exemplary application includes systems that make recommendations for movies, music, books and other content, based on tracking the past behavior of individuals or certain demographics and sometimes based on soliciting preferences ("votes") between hypothetical choices. Many other applications exist. Irrespective of application, these systems are often manifested as software running on a computer (e.g., standalone computer, portable device, smart phone, server, diverse network machines or some other form of one or more instructed-machines). This software performs automated polling or collection of data, and scoring of results.

While generally useful for their intended purposes, these systems generally are poor at extracting group preferences as the number of possible choices increases. For example, each individual in a group can be asked to order available choices as a set or to vote between each possible pair of choices. However, some individuals are daunted by the time needed to order a large set of choices or to vote between many combinations, and therefore do not participate. Some individuals do not take the time to view and evaluate each choice before voting, and so, express their results in a biased manner It can be computationally intensive to collect preference data between each possible pair of choices. Finally, some individuals vote on some choices (e.g., their favorites) but not all possible choices, rendering it difficult to interpret relative scores where the voting weights are different. The consequence of these issues is that the mentioned-systems can produce results based on a sparse, biased subset of group beliefs, and it can become difficult to generate a comprehensive, accurate scoring across all possible choices.

What is needed are systems, machines, software and techniques that address the aforementioned problems. The present invention satisfies these needs and provides further, related advantages.

BRIEF DESCRIPTION OF THE DRAWINGS

in FIG. 2A, movies "movie 1" through "movie 10" have already been positioned within a binary tree, and it is desired to place "movie11" within the depicted tree.

FIG. 2B exemplifies one method of height-rebalancing for the binary tree of FIG. 2A, invoked when and as the addition of movie11 triggers a rebalancing threshold.

FIGS. 3A-3Q are used to explain rules associated with red-black tree manipulation, with numeral 301 being used to denote the tree as it is being formed.

FIG. 3A shows the placement of a first node 302, and its coloration as "black" (i.e., with hatched fill).

FIG. 3B shows placement of a second node 303 to the right of the first node 302 (e.g., indicating that the choice represented by the second node 303 is preferred to the first node 302); the second node 303 is colored "red" (solid fill) in accordance with traditional red-black coloring rules.

FIG. 3C shows placement of a third node 304 to the left of second node 303.

FIG. 3D shows clockwise rotation of the second and third nodes 303 and 304, to invert their locations; a rotation operation is denoted by graphic 305.

FIG. 3E shows a second, counterclockwise manipulation of all three nodes 302, 303 and 304 (including establishment of a new root node), as depicted by graphic 305.

FIG. 3F shows recoloring of nodes 302 and 304 in associated with specific red-black tree manipulation rules discussed herein.

FIG. 3G shows addition of a fourth node 306 to the binary tree 301.

FIG. 3Q shows the ensuing counterclockwise rotation of all nodes of the binary tree 301 through the root node as a consequence of the addition of the ninth node 311 of FIG. 3N, and associated recoloring; note that a new root node (node 307) is established because of this rotation.

Figure 1A:
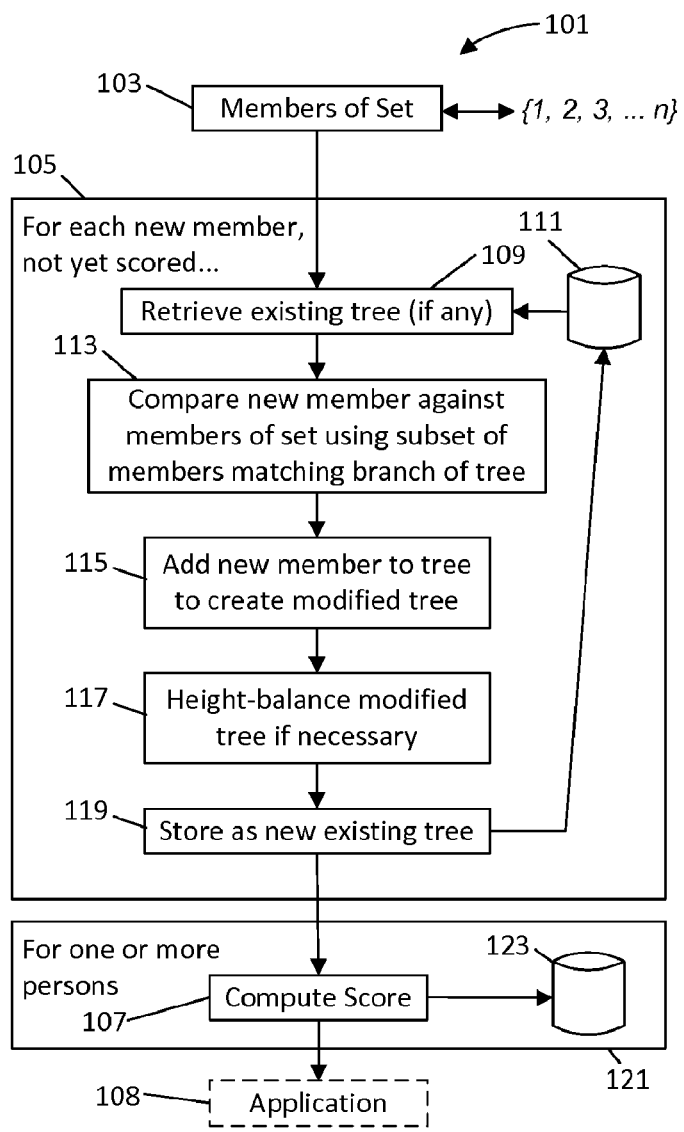
FIG. 1A shows a block diagram associated with scoring members of a set.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application. The description exemplifies methods and devices, especially as software or a network service, supporting use of a height-balanced tree to govern the eliciting of relative preference data between discrete subsets of an overall set, with the result that relative preference data scoring need not be obtained between every possible subset combination of members of a large set. While the specific examples are presented, the principles described herein may also be applied to other methods, devices and systems as well.

DETAILED DESCRIPTION

This disclosure provides methods, devices and systems supporting use of a height-balanced tree to enable eliciting of relative preference data between discrete subsets of an overall set, with the result that relative preference data need not be obtained between every possible pairwise permutation of members within the overall set.

These methods, devices and systems can be applied in a number of applications in which it is desired to score (or rate or sort) members of a set. For example, polling can be used to determine preferences of a group. While forecasting, such as to predict the outcome of political elections is one common example of polling, there exist many applications of polling to everyday life. For example, one hypothetical embodiment discussed below (with reference to FIGS. 5A and 5B) is for a television network wishing to determine viewer interest in an alternative football game to air in a specific time slot. Similarly, these techniques can be applied to stock markets or other information markets to predict futures of various types; in one contemplated application, a corporate forecasting tool elicits information from corporate employees, and uses this information to forecast quarterly or annual results. The methods, devices and systems can also be applied to audience voting (e.g., to determine the winner of a talent contest), gaming and to many other applications where it is desired to score, rate or sort members of a set. Note that the voting or expression of interest need not be explicit, e.g., it is possible to infer an individual's preferences from behavior such as from user viewing of certain web pages or other types of actions.

Generally speaking, embodiments are discussed below as instructions stored on non-transitory machine readable media (e.g., software) which are adapted to cause one or more machines (e.g., computers) to take certain actions when those instructions are executed. The techniques described herein can be applied to standalone software, network software (e.g., running on diverse machines), as a web- or other network service, or in another desired manner I. Introduction.

A few hypothetical examples might help exemplify the benefits provided by the teachings herein. If it be assumed that a hypothetical set consists of 30 members, each pairwise combination might conventionally require a minimum of 30-choose-2 combinations (or 435 comparisons) to evaluate relative preferences between each possible alternative. Conventionally, this type of evaluation might be considered computationally prohibitive depending on the application, and it would be common for the set to be evaluated in a number of alternative ways (e.g., by asking individuals to select "their top 3 choices," or to have voting limited to pre-cast brackets), and to aggregate voting on this basis. However, the techniques discussed herein would instead require far fewer comparisons (e.g., typically no more than approximately 100 comparisons for this hypothetical to completely evaluate all members of the set).

The disclosed techniques can be applied in different ways.

In one implementation, a complete binary tree representing members of the set (i.e., each possible choice) is built for an individual; N members at a time are selected as subsets for which relative comparison data is to be elicited. Based on each comparison iteration and consequent preference data, each member of the set is associated with a node in the tree structure. As the binary tree is built, other members of the set are then compared to the tree structure, to also obtain preference data for these new members and associate them with new nodes in the tree structure. Note that to reduce the number of such operations, as the new nodes representing each member are added to the tree, the tree is periodically rebalanced in terms of its height. For example, one type of tree (discussed below for certain embodiments) is a red-black tree structure, which uses certain rules to continually test the tree for height balance and, as appropriate, to rebalance the tree in terms of its height. Other types of trees (i.e., other than red-black or binary trees) can also be used, depending on embodiment. Once all members of the set are organized into the height-balanced tree, each member receives a score depending on the number of times it was voted on and preferred (or rejected). Note that with a height-balanced tree structure, each of the members of the set can be the subject of a significantly different number of comparisons (e.g., it is possible for one member in a large set to have been the subject of as little as a single comparison only). To relate this in real-world terms, in one hypothetical application where viewers rate their video or movie interests, it is possible for poll-participants to consistently prefer a movie of particular type or genre (romance), only to have that movie be consistently rejected in favor of a preferred alternative; in such a context, it is typically desired to score that movie more highly than one more "distant" from the preferred genre (e.g., a horror movie). Embodiments discussed herein do exactly that. Clearly, many similar applications and analogies exist outside of the context of content rating. In one embodiment, therefore, scores are tallied based on the constructed tree in a manner that tallies both "yes" and "no" votes for each member collected during building of the tree and then that computes a score based on these votes. Other scoring mechanisms are also possible. Once a score is computed for each member, the set of all members may be processed (e.g., sorted or rated) based on the respective scores.

In another implementation, it might be desired to poll how a specific choice rates against other preexisting alternatives. For example, a height-balanced tree might already have been computed to represent these preexisting alternatives. The specific "new" choice is compared in a manner that takes only one branch path of the tree; for example, it is compared first against a preexisting alternative represented by the root node of the tree. Depending on this comparison, the new choice is then subsequently compared against one of the "first tier" branch nodes. This process continues, using a single node in each successive tier for comparison until the new choice is placed as a leaf node in the tree; the tree is then height-rebalanced as necessary, so as to minimize the number of node comparisons for the next evaluation. Note that this process is the same process as just described above for the building of a tree, but the difference here is that the tree may have already been previously constructed (e.g., optionally based on input from other individuals). This is to say, the techniques described herein can be employed in the building of a tree from scratch as well as to the insertion of a new member of that tree (each member is a "new member" as the tree is being built). Note that although not discussed extensively for embodiments below, known techniques for manipulating height-balanced trees may be applied to node-removal situations (i.e., withdrawal of a possible choice or option), and these techniques (and associated tree balancing and rescoring of preference data) are nevertheless considered within the scope of this disclosure.

As this discussion implies, in one embodiment, a height-balanced tree can be built for multiple individuals, and used to develop scores for each individual for each member of the set; the scores can then be aggregated across individuals and used to build a group score for each member of the set (i.e., for each choice). In an alternate embodiment, a height-balanced tree can instead be computed for a group, e.g., with each individual asked to rate only certain subsets (e.g., exactly 3 pairwise combinations) and the height-balanced tree constructed from many such ratings from the group in the aggregate. Other possibilities also exist.

Figure 1B:
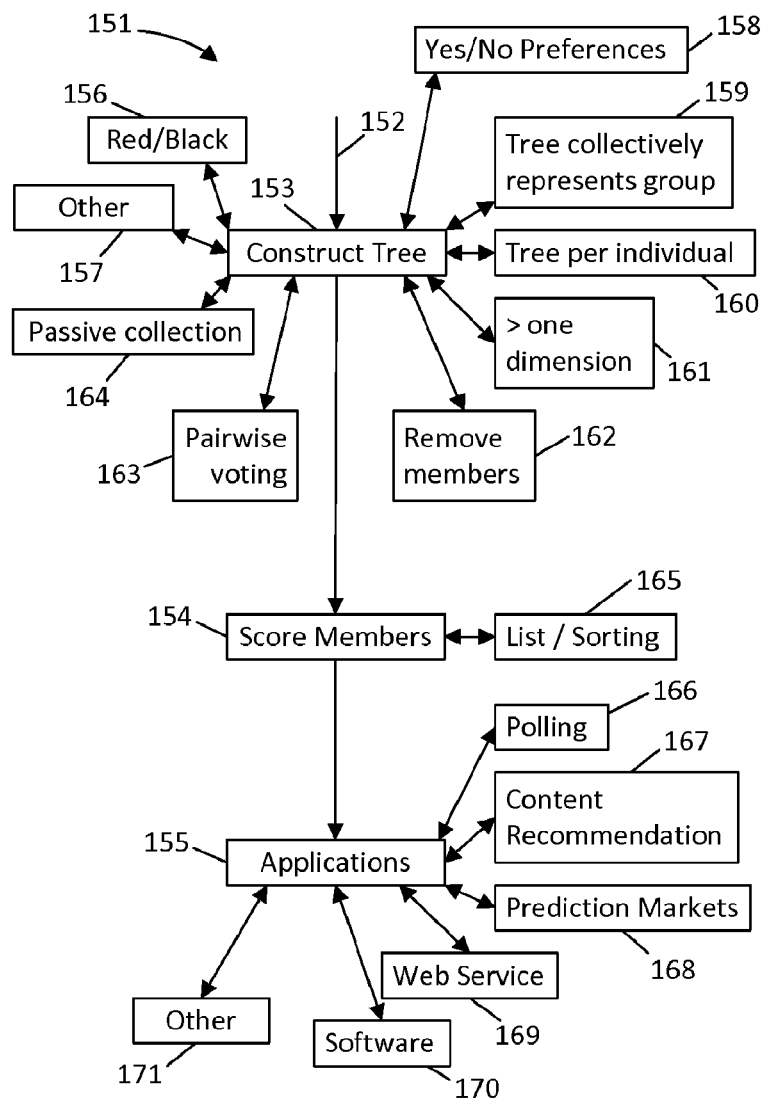
FIG. 1B shows the method of FIG. 1A in the context of various options and possible applications.
Figure 1C:
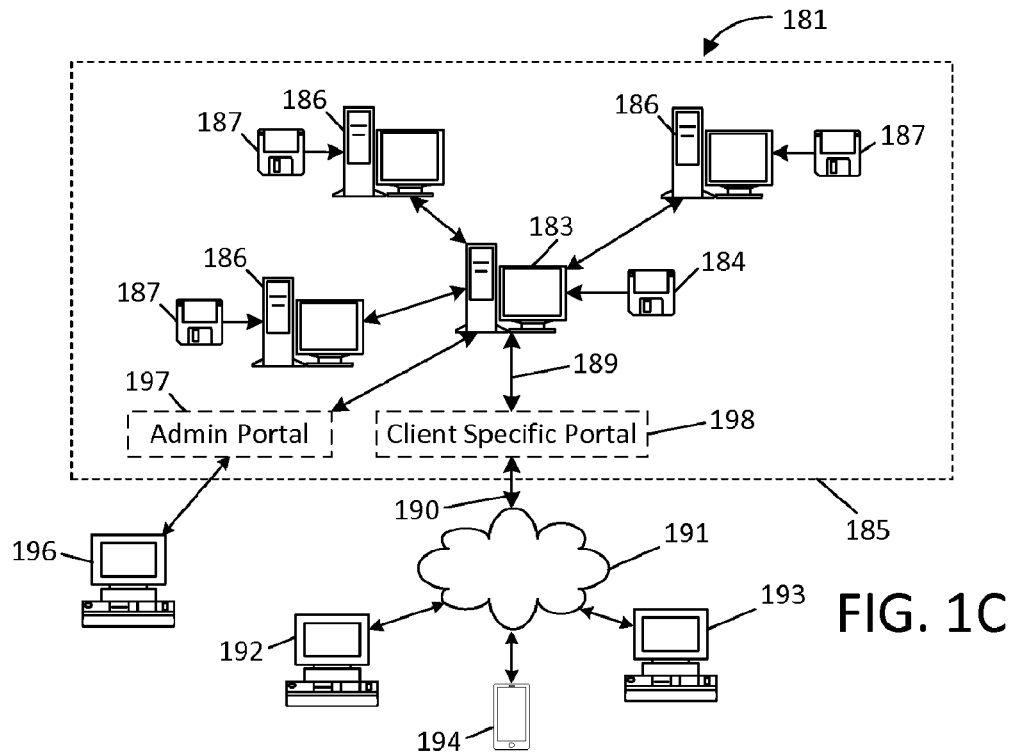
FIG. 1C shows one exemplary platform for implementing the structure depicted in FIGS. 1A and/or 1B.
Figure 3H:
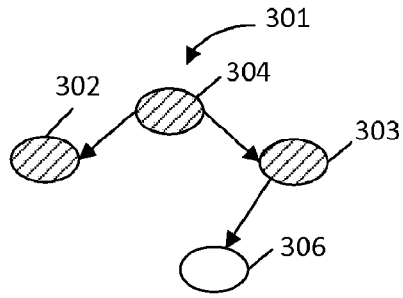
FIG. 3H shows recoloring entailed by the addition of the fourth node 306 in FIG. 3G.
Figure 3K:
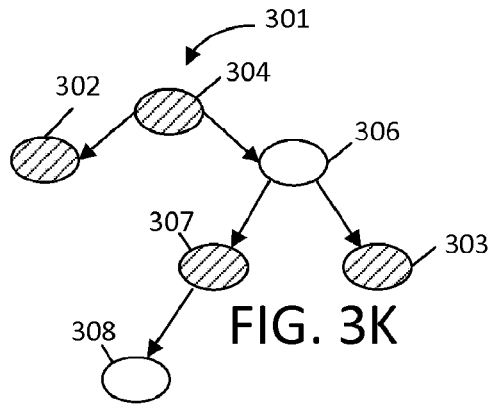
FIG. 3K shows the addition of a sixth node 308 to the binary tree 301 and related recoloring of nodes 303 and 307.
Figure 3I:
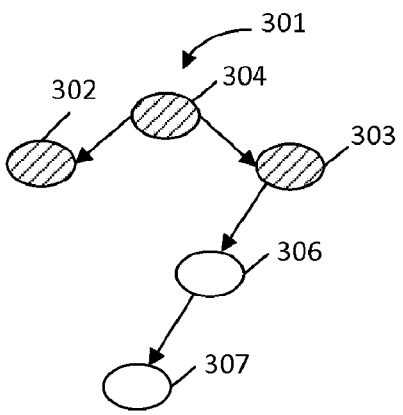
FIG. 3I shows the addition of a fifth node 307 to the binary tree 301.
Figure 3L:
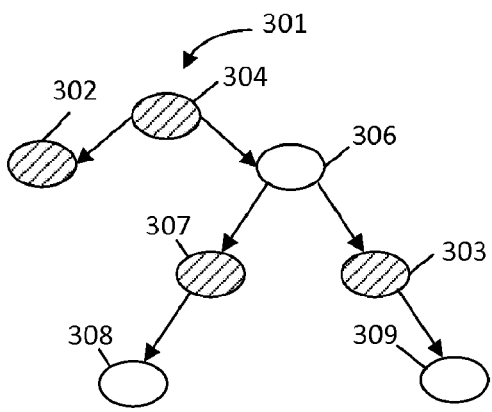
FIG. 3L shows the addition of a seventh node 309 to the binary tree 301.
Figure 3J:
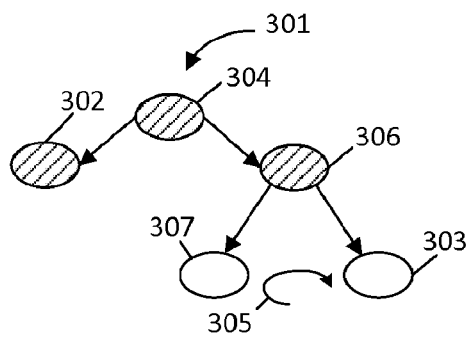
FIG. 3J shows the rotation of the second, fourth and fifth nodes 303, 306 and 305 in a clockwise direction, as denoted by graphic 305.
Figure 3M:
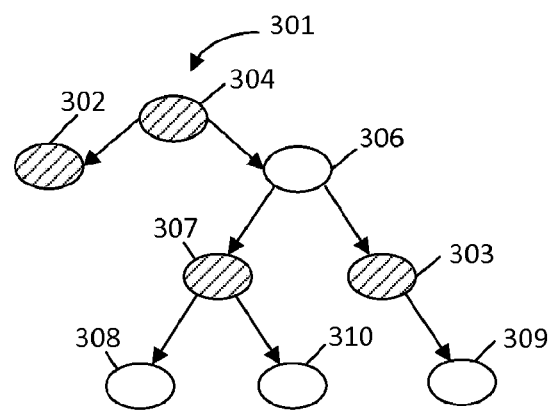
FIG. 3M shows the addition of an eighth node 310 to the binary tree 301.
Figure 3N:
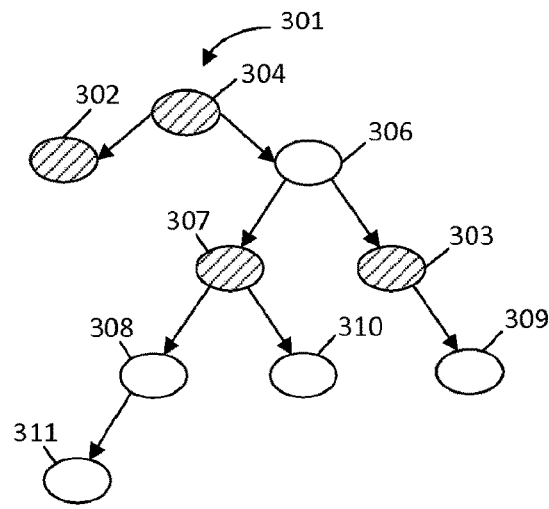
FIG. 3N shows the addition of a ninth node 311 to the binary tree 301.
Figure 3P:
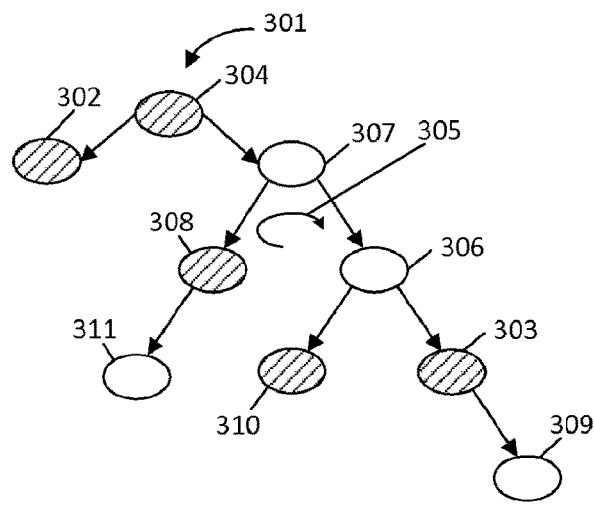
FIG. 3P shows clockwise rotation of nodes 311, 308, 307, 306, 303 and 309 entailed by the addition of the ninth node 311 of FIG. 3N, as indicated by graphic 305; note that node 310 has been moved to depend from node 306.
Figure 3O:
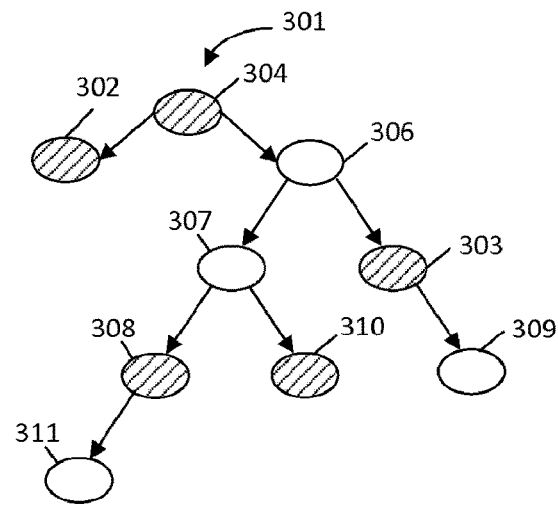
FIG. 3O shows recoloring of the firth node 307, the sixth node 308 and the seventh node 309 as a consequence of the addition of the ninth node 311 of FIG. 3N.
Figure 4:
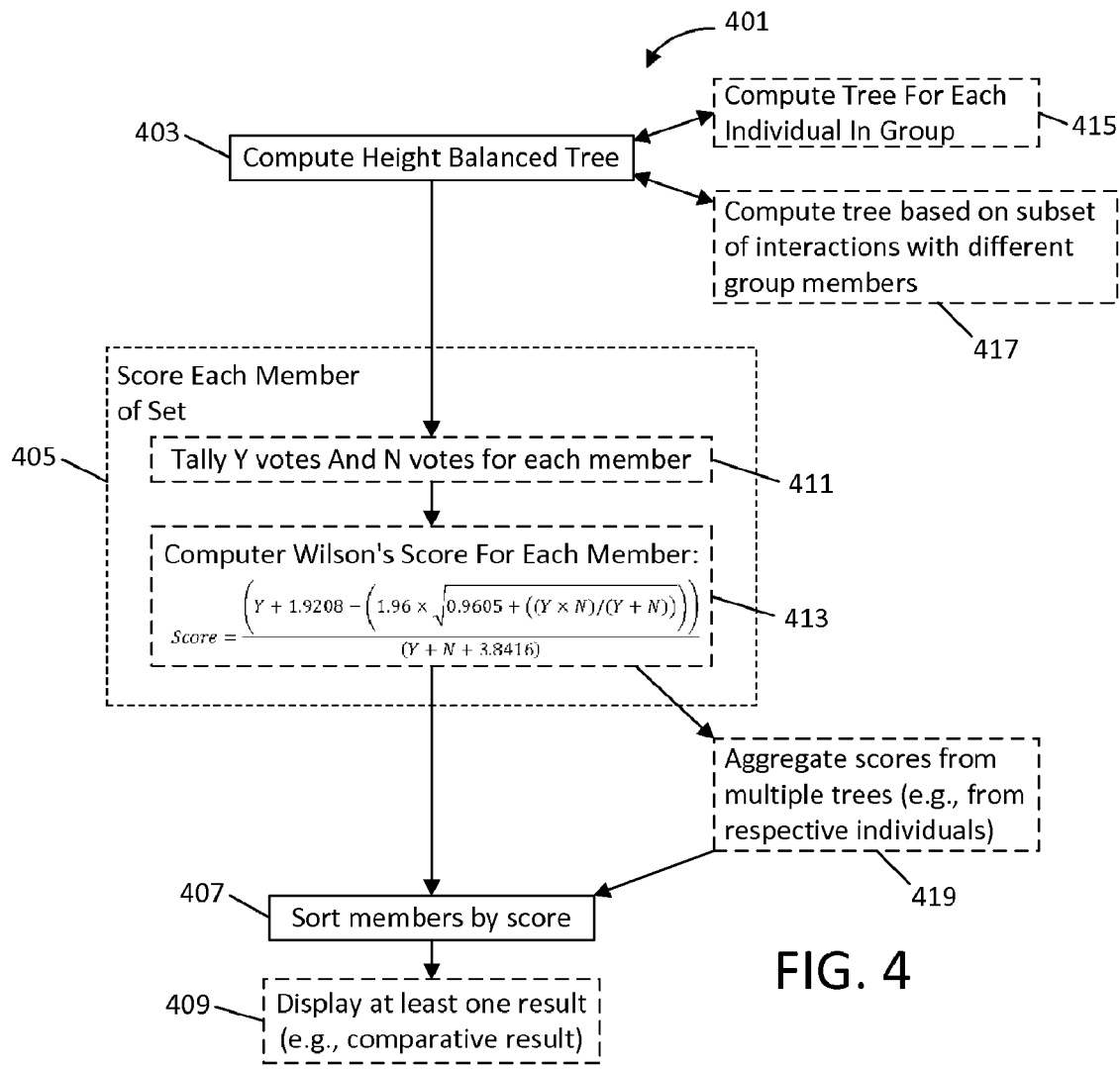
FIG. 4 is a block diagram used to discuss scoring options.
Figures 5A, 5B:
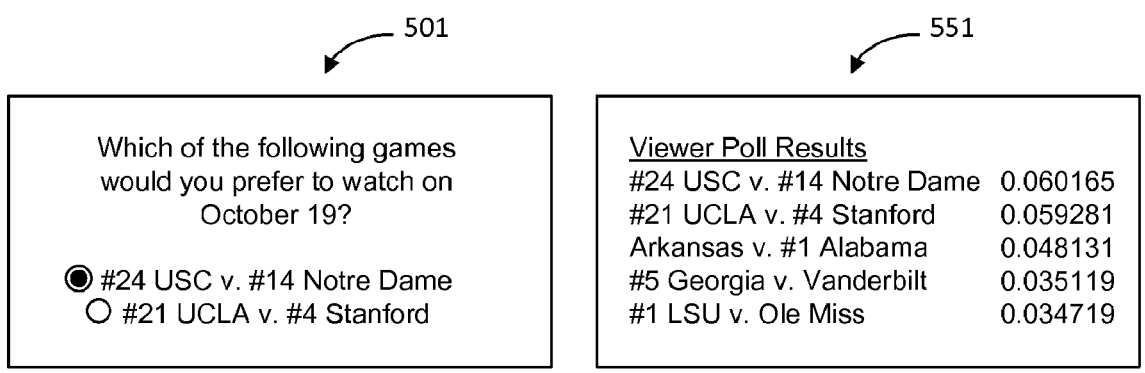
FIG. 5A shows a screen shot presented by one hypothetical web page, used to solicit an individual's preference between multiple choices.
FIG. 5B shows a screen shot presented by one hypothetical web page, used to display results of scoring and/or voting.

With the techniques described herein generally introduced, this disclosure will now proceed to more detailed discussion of certain embodiments. Generally speaking, FIGS. 1A-1C are used below to describe general techniques for collecting preference data and scoring members of a set, and related system, device and software implementations. FIGS. 2A-3Q are used to discuss concepts associated with use of a height-balanced tree to reduce the number of comparisons needed to evaluate all members of a set, with FIGS. 3A-3Q being used for discussion of a red-black tree structure. FIG. 4 is used to discuss options for running a scoring process for a single individual or group of individuals. Finally, FIGS. 5A and 5B are used to discuss one possible implementation (e.g., screen shots associated with a network web-poll for a specific football game to air in a specific time slot). Many other examples are possible.

II. Collecting of Preference Data.

FIG. 1A shows a block diagram of a method 101 for collecting preference data representing members of a set, and then scoring that data. The members of the set are collectively represented by numeral 103 and designation {1-n}. These members can be any choices or selections that are to be compared to one another, for example, alternate political candidates, alternate content in the form of books, movies or music, alternate possible results for an unreleased corporate forecast, or nearly any other set where the members are to be voted between or scored or rated relative to one another.

Per the discussion above, it is assumed that it is desired to collect preference data among these members from at least one individual, to build a tree on an incremental basis, such that all of members {1-n} are ultimately represented by the tree. Numeral 105 generally represents this iterative process. During the building of the tree, expressed preference data is collected and retained such that each member {1-n} can be assigned a score following the tree building process. The scoring process is generally represented by numeral 107 in FIG. 1A. The tree is used to limit the number of iterations, such that the members of the set can have unbiased scores collected, all without needing to exhaustively compare each member of the set against one another. The retained preference data and, ultimately, assigned scoring, is used for the voting, scoring, rating or ranking process (these functions will be collectively referred to herein simply as "scoring"). Once scoring is completed, the scoring can be applied in an optional, desired manner as indicated by numeral 108 in FIG. 1A. Non-limiting, example applications will be discussed further below.

During the process of building the tree, if a tree already exists, its structure (i.e., the placement of previously considered members as nodes) is digitally defined and stored in memory, as referenced by numeral 109 (non-transitory digital memory is represented by numeral 111). The storage format can be as simple as an indication of numbers of members already in the tree, an indication of the type of tree used (e.g., a binary tree), the total number of levels or tiers in the tree, and an address or other identifier assigned to each member already placed in the tree; if a red-black tree structure is used, a bit can also be used to indicate for each member whether its node is colored black or red. For example, if there are 15 members already placed in a binary tree, positioned as a five level tree with some leaf nodes still empty, addresses from 0-31 could be used to describe which node represents each respective member already in the tree, with a bit denoting node color.

It was earlier mentioned that the method 101 is used for incremental building of a tree, i.e., even if no tree yet exists. To this effect, in one embodiment, all members of the set are received, with an arbitrary first member of the set being assigned a root node position within the tree. With height-balancing (as further discussed below), the root node can be shifted in its position as the tree is built, with ultimate repositioning of this first member to a leaf node (or other node) as may be appropriate given elicited preference data. In one embodiment, for example, the first available member of the set can be assigned this root node (e.g., on a first-in, first-out or "FIFO" basis). Note that it is also not necessary that all members of the set be known a priori. For example, in a prediction market applied to corporate forecasting, a new possible outcome can be added or suggested at any point in time (e.g., by an individual being polled as to belief as to the outcome as an event). If a previously un-suggested outcome is submitted, this new suggestion would become a member of the set and could be placed in a pre-existing tree using the processes described below. That is, for example, if a tree had already been constructed for a group and/or a particular individual, a member of the group and/or the individual could again be polled to determine relative preferences for the new member (the new suggestion) to place it within the preexisting tree.

Each member of the set not represented by the tree is then compared with the tree on an incremental basis. In one embodiment, multiple such "new" members can be compared with one or more "existing" members of the tree, e.g., in a comparison process that elicits data for more than two members at a time. It is also possible to compare one "new" member at a time with multiple members of the tree; note that this is equivalent to performing multiple binary comparisons at a time, e.g., preference data suggesting that ranks A, B and C as a desired order of preference is equivalent to pairwise ranking of A>B, B>C, and A>C. In many of the embodiments discussed in detail below, however, the comparison process is performed on a pairwise basis; that is, the comparison is performed using one "new" member versus exactly one member already in the tree. This process is represented by numeral 111 of FIG. 1A. Note that one to many such comparisons are performed to place each "new"

member into the tree using successive nodes for each comparison. For example, if 15 members are already placed in a binary tree as a 4-level tree, a new member to be placed into the tree is first compared against a root node, with a branch of the existing tree then being taken for the next iterative comparison depending on the preference expressed in the first comparison. The following iteration then compares one of two level one nodes with the new member (depending on the result of the first comparison). This process continues until the new member is positioned as a leaf node within the tree, per numeral 115.

Note that as this happens, the tree is expanded in a manner that can make its height unbalanced. For example, without height balancing, it is possible (e.g., assuming a 30 member set) for all members to be placed such that the tree only has one branch, with 30 tiers. As referenced earlier, one benefit of the techniques discussed herein is limiting the number of comparisons, such that all members of a set do not need to be compared exhaustively to one another. While a 30-member set represents one simplified, hypothetical example, the number of such comparisons can be quite computationally expensive for large sets. To this effect, height balancing is used to reorder the tree so as to reduce the number of comparisons, and essentially force branching within the tree as it is constructed. This process is represented by numeral 117 in FIG. 1A. The tree is then used to control future comparisons. Note that it is not necessary that this process be performed continually or at every iteration of adding a new member to a tree, e.g., in some embodiments, it can be performed occasionally or sporadically. Also, the term "height-balanced" should not be understood to require that all leaf nodes of the tree be distributed "within one level" of one another. Indeed, in the case of a red-black tree, it is possible to have leaf nodes that are two-or more levels apart according to the rules associated with red-black trees. That is, a red-black tree typically guarantees that any one branch path will have no more than twice the number of total nodes relative to any other branch path. Typically, this means that any placement of a node will require a number of iterations approximately equal to the binary logarithm of the number of set members, rounded upwards to the nearest integer "j" (j>0), where the term "approximately" means that the number of iterations will be between j/2 and 2j.

In more detailed embodiments discussed below, as each new member of the set is added as a leaf node, the tree is tested to determine whether it violates any predetermined criteria for height. If the tree does violate such pre-established criteria, a subroutine is called to process modify the tree according to a defined set of rules. As referenced earlier, in one embodiment, the tree is a red-black tree (i.e., a special case of a binary tree) and red-black tree-building rules are used to recolor or otherwise modify nodes of the tree. Note once again that while binary trees are reference extensively herein, other types of trees can be used depending on embodiment.

Each "new" member is compared with existing members already in the tree in a number of iterations as necessary to traverse the tree, from its existing root node until a leaf node is reached appropriate for the new member. Subject to any appropriate height-rebalancing, the modified tree is then stored back in memory 111 as the existing tree for use in considering the next "new" member. This process is represented by numeral 119 in FIG. 1A. For example, in a hypothetical set of 16 members, with 7 members already in an existing tree, the $8^{th}$ member would be iteratively considered and used to create an 8 member tree, height-rebalanced as appropriate. The modified 8-member tree would be the existing tree used in considering the $9^{th}$ member, and the process repeated until the $16^{th}$ member was finally placed in the tree.

As noted earlier, the use of a tree structure helps limited the number of comparisons needed to score each member, while at the same time, scoring each member of the overall set in an unbiased manner To this effect, in one embodiment, each member is scored not only when it is placed as a "new" member into a tree to create a modified tree, but also when it is subsequently compared as a member of the tree against a subsequent "new" member. When the tree has been fully built (i.e., all members considered), the preference data obtained from all such comparisons is tallied for each member and used to assign a member-specific score, as represented by numeral 107. The respective members' scores can then be stored in memory such as denoted by numeral 123 in FIG. 1A.

FIG. 1A uses numeral 121 to identify that scoring 107 can be performed for one or more persons. That is, as mentioned, in one embodiment, a tree is built for a single individual, and used to score members of the set. In a second embodiment, this can be done independently for each of several individuals, with either the preference data or the computed scores for each individual being tallied across individuals, to identify a group score. For example, considering a simplified hypothetical case where results from individuals 1 and 2 are aggregated and the data represents set members A and B, if individual 1 effectively scored members A and B respectively as 0.64 and 0.58, and individual 2 effectively scored members A and B respectively as 0.66 and 0.64, these could be combined to obtain an aggregate score of 0.65 and 0.61 for set members A and B, representing a group score. The "yes"/"no" votes (i.e., from each comparison) could instead first be aggregated for individuals 1 and 2 and then used to compute a score. Other methods of expressing preference data, or of tallying or computing scores can also be used. In yet a third embodiment, each tree can be built to itself represent a group of individuals. For example, with a very large set of members and a very large target audience (i.e., participants), each participant could be asked to rate either a subset of members, or to provide preference data for a subset of iterations needed for placement of a single leaf node. The method 101 then builds a tree representing the target audience as a whole. The preference data aggregated for the group would then be scored. Clearly, many such permutations are possible.

Once scoring has been assigned to each member of the set, the scoring can then be applied as desired, for example, as part of a prediction market, voting, rating or other application. For example, in one hypothetical embodiment discussed below in connection with FIGS. 5A and 5B, the method 101 can be applied to poll an audience as to the "group preferences" for college football games to be aired. In applying the results of voting, a network could publish the vote and/or assign a specific game to a pertinent time slot in dependence on the voting. Many other applications are possible, e.g., the method 101 can be applied to computer gaming and/or Vegas-style gaming (gambling), prediction market, polling, corporate forecasting, or nearly any desired application. Numeral 108 denotes the application of the results of scoring to any such desired application.

FIG. 1B provides a flowchart 151 that illustrates various principles, options and implementations associated with scoring members of a set. As denoted by numeral 152, it is desired to ascertain relative preferences of a target audience including at least one individual amongst members of a set. Preferences of this target audience are collected and used to construct a height-balanced tree representing all alternative choices, as indicated by numeral 153. As before, height-balancing is used in part to limit the number of comparisons needed to place all such choices in the tree, and obtain a meaningful, relatively unbiased set of relative votes (or preference data). This data is then used to score the various choices (i.e., the members of the set), per numeral 154. As indicated by function block 155, the scoring can then be optionally applied to a selected application, as introduced above.

A number of options 156-164 are depicted as associated with the constructing of a tree 153.

First, as indicated by numeral 156, the tree can optionally be constructed and managed according to red-black tree rules. It is noted that different rules are sometimes associated with red-black tree manipulation depending upon authority (i.e., publication source), and therefore an exemplary set of rules will be set forth below and defined herein. A red-black tree as used herein typically colors nodes either "red" or "black" and specifies that a function of the number of red nodes and black nodes on each possible root-to-leaf path of the tree must evaluate to a common result; if addition of a node creates a situation where these rules do not hold true, then the tree is deemed unbalanced in terms of height, and is height rebalanced. There exist a number of different red-black tree configurations that can satisfy these criteria. Certain embodiments discussed below will apply more specific red-black tree manipulation rules associated with a specific red-black tree process. For example, rules used for certain specific embodiments below herein call for (a) each root node to be colored black, (b) each root-to-leaf branch path to have a like number of black nodes as any other root-to-leaf branch path, and (c) no use of two consecutive red nodes. Note that the coloration of each node as "red" or "black" is a fiction, i.e., a semantic; nodes can typically be recolored in a manner consistent with the mentioned rules in a manner that does not affect tree height, and whether a node is colored as black or red does not affect the fact that the node in question represents a specific choice or member from the set. If a tree is deemed to be unbalanced (i.e., because these criteria above are not satisfied), certain techniques are used to rebalance the tree, including rotation of subset branch paths of the tree, moving leaf nodes between different branches of the tree, and rotating the entire tree itself to establish a new root node. These techniques will be further discussed. As should be apparent, the specific red-black rules just introduced provides a guarantee that, all nodes considered, no branch path will be more than twice as long as any other branch path (i.e., otherwise the requirement of a like-number of black nodes in each path and/or the rule against two successive red nodes would be violated). That is to say, as mentioned above, there is a number of iterations needed to place each new member in the tree that is approximately equal to the binary logarithm of nodes members already in the tree.

The use of red-black tree manipulation rules is not required for all embodiments; therefore, numeral 157 expresses the option that other forms of tree manipulation can be used, e.g., other forms of binary trees or non-binary trees.

Per numeral 158, in one embodiment, robust scoring is obtained by tracking both situations when one set member is preferred relative to a member, as well as when it "loses" (i.e., is not preferred). This data can be tracked in a number of ways, including for example the number of times a member was selected relative to the overall number of times a member was compared with another member. Note that with height-balancing of trees, the overall number of comparisons is not necessarily inherent to final tree configuration; for example, it is possible in some embodiments to have a node subject to relatively few comparisons end up as an intermediate or root node because of tree rotation principles. By tracking not just situations where a set member was preferred, but situations where a set member loses a comparison, more robust tracking can be obtained by weighting the losing member more heavily than to members not subject to frequent comparison. For example, it should be understood from a practical standpoint that the navigation of a particular branch path in a tree structure indicates that the selected path is preferred relative to other branches. This provides a mechanism for weighting unselected members of the set, and therefore for fairly scoring all members of the set without requiring a head-to-head comparison between each alternate choice.

As indicated by numeral 159, in one embodiment, a tree can optionally be constructed to represent multiple individuals as a group; alternatively, per numeral 160, in addition to this or instead of this process, a complete tree (i.e., preference analysis) of all members of the set being considered can be built for each individual. If the system is being applied to a single individual or entity, the single computed tree can be used to score members of the set as a function of the specific individual's or entity's preferences; if a group is being polled, trees (or preference data) can be computed for each person or small group of persons and then aggregated to build a group rating. Once again, many such variations exist.

Per numeral 161, in one embodiment, each member of a set can be scored in one of several dimensions, with a scoring process applied to each dimension. For example, as pertains to content recommendation, a song or movie can be simultaneously analyzed along a number of different axes, each axis representing a different dimension of user preferences (e.g., action, versus adventure, versus romance, versus intrigue, and so forth). Scoring each member of a set in different dimensions enables the building of profile information for the specific individual, e.g., for purposes of movie, book, music, food, dating, or other types of recommendations.

It was earlier mentioned that exemplary applications involve the building of trees on an incremental basis. However, as reflected by numeral 162, the techniques discussed herein can also be used to score members when one or more of the members have been removed from a set. For example, the red-black tree manipulation rules, while sometimes varying from source-to-source, have straightforward analogies for tree manipulation when a node becomes unavailable. Such manipulation also involves the coloring of nodes and branch rotation, so as to avoid violating rules associated with tree structure. In the case that node removal causes a violation of rules for proper tree height, the tree is rebalanced as necessary.

As indicated by numeral 163, in one embodiment, voting is pairwise; that is, as noted earlier, a "new" (or "second") member of the set not already represented by the tree is compared to a single "existing" (or "first") member of the tree. In a first iteration, the first member is selected to be the member at the root node of the tree. Depending on whether the new member is preferred over the root node (or not), the right child node of the root node (or the left) is selected for the next iteration for comparison with the "new" member, and the process is repeated until the new member is placed as a leaf node in the tree. This is to say, for this option, each iteration compares exactly two members, i.e., the member represented as a single node and a single choice not yet represented by the tree. As noted above, this is not required for all embodiments; in one embodiment, for example, two or more existing members of a tree form the basis for simultaneous or chained consideration with a new member and in another embodiment, two or more new members can be used as the basis for comparison with a new member.

Finally, as indication by numeral 164, in one embodiment, voting or preference data extraction is passive, i.e., is inferred from other types of conduct, as contrasted with a situation where a user is expressly asked to select between two choices. For example, in one application, an individual's browsing activity (or e.g., music or video viewing activity) is monitored and used to convey preference data between alternate choices. Many options exist for how subsets of set members can be conveyed to and expressed to an individual and how preference data can be extracted from the individual's actions.

As denoted by numeral 165, options also exist in terms of how scoring is performed or utilized. For example, once a score has been assigned to all members of the set, those members can be sorted or otherwise manipulated in any desired way. In a voting application (e.g., where trees are computed for each individual in a group, and respective set members' scores totaled), scores for all members or any subset thereof can be displayed.

Numerals 166-171 are used to identify some non-limiting applications for the scoring just referenced. Many of these applications have been listed earlier. For example, as indicated by numeral 166, the scoring process just referenced can be used as a part of a polling process, where it is desired to determine a preferred member of the set of choices, or how a specific member ranks relative to one or more other members. Alternatively, per numeral 167, the scoring can be applied to content recommendation based on profiling of members; for example, the fact that individuals score certain choices in a specific way can be used to group individuals together to recommend content. Here, scoring can be used both to identify content that can be recommended as well as to profile individuals for purposes of identifying a target audience. As suggested by numeral 168, these techniques can also be applied to prediction markets, where individuals are asked to trade in virtual stocks representing events uncertain, with preferences and beliefs being inferred from each individual's trade of futures, and with the individuals being rewarded for trades representing correct predictions. As indicated by numerals 169 and 170, two exemplary, contemplated applications for the discussed techniques are as a web service (e.g., as a web based prediction market or polling service) and as software sold for use by companies seeking to establish their own polling, prediction, rating or recommendation processes. Per numeral 171, many other examples also exist.

FIG. 1C shows one implementation of techniques discussed herein, that is, to a web-based service 181. More specifically, the service is rooted in at least one machine 183 such as a web-server running appropriate software 184 (i.e., an example of instructions stored on non-transitory machine-readable media). The machine can optionally be a proxy server that defines a network boundary of an entity 185 with many such machines, e.g., computers 186, each running pertinent software 187. As denoted by arrows 189 and 190, the web-based service communicates over a wide area network 191 (a "WAN," e.g., such as the Internet) with the digital devices of various end users, for example, computers or laptops 192 and 193, and smart phones, digital touchscreen pads and similar devices, collectively depicted using numeral 194. Note that relative to the techniques discussed above, these techniques can be implemented on a distributed basis, for example, with machine 183 generating pairwise comparisons and machines 186 performing scoring or other functions. In such a context, comparisons can be elicited via web pages that are formulated by machine 183 and transmitted in HTML or other format to end-user devices 192, 193 and 194. For example, a web page can be formulated that asks the user of smart phone 194 to compare a first choice, representing a member of a set positioned at a root node within a height-balanced tree, as part of a pairwise comparison. The web page in effect represents image data that, when displayed on a micro-browser of the smart phone, visually presents two choices and asks the user of the smart phone to select between them. The user's selection can be input via the client device (e.g., smart phone 194) and relayed back to machine 183 (e.g., triggered through the use of JAVA code downloaded with the web page, the user selection of a link, or in some other manner) For each iteration, a new web page can be downloaded to the digital device and used to elicit preference data for each pairwise combination selected for presentation. A distributed environment can also be made to include the digital devices 192, 193 and 194; for example, in an alternate embodiment, all possible choices can be initially downloaded with page scripts (e.g., JAVA code) that cause the client digital device (e.g., smart phone 194) to itself iteratively select subsets of all set members for pairwise comparison; once the digital device builds a height-balanced tree, associated preference data and/or scoring can then be reported back to machine 183. Once again, these examples should be viewed as non-limiting, and many possibilities exist. Note that any results of scoring can also be formatted into a web page for display on a digital device (e.g., a computer) and sent to a digital device.

In one application, the web-service 181 is run on a subscription basis for a corporate client. To this end, a client administrator (represented by numeral 196) remotely accesses machines 183 and 186 through an administrative portal (e.g., which applies security functions, scaling, service interaction and similar functions). An administrator can establish specific sets of choices that are to be compared, or specific prediction markets (e.g., quarterly profits for a prediction market being run internal to a corporation), can manage group membership for individuals permitted to view choices and express preference data and/or see results. If desired, results can be made visible to the administrator or can be transmitted to a specific individual, such as a specific user of digital devices 192, 193 or 194. Note that a web-service can concurrently service many such clients on a subscription basis, and to this end, a client-specific portal 198 can be used in concert with a subscription database to perform periodic billing (e.g., monthly or per-use billing), and also to restrict access to specific sets of data (e.g., specific prediction markets, rating systems, etc.) to specific groups of individuals (e.g., a specific company's employees of a certain class).

With general principles associated with preference data collection thus introduced, this disclosure will turn to a more detailed examination of trees used in this process.

III. Use of a Height-Balanced Tree.

Figure 2A:
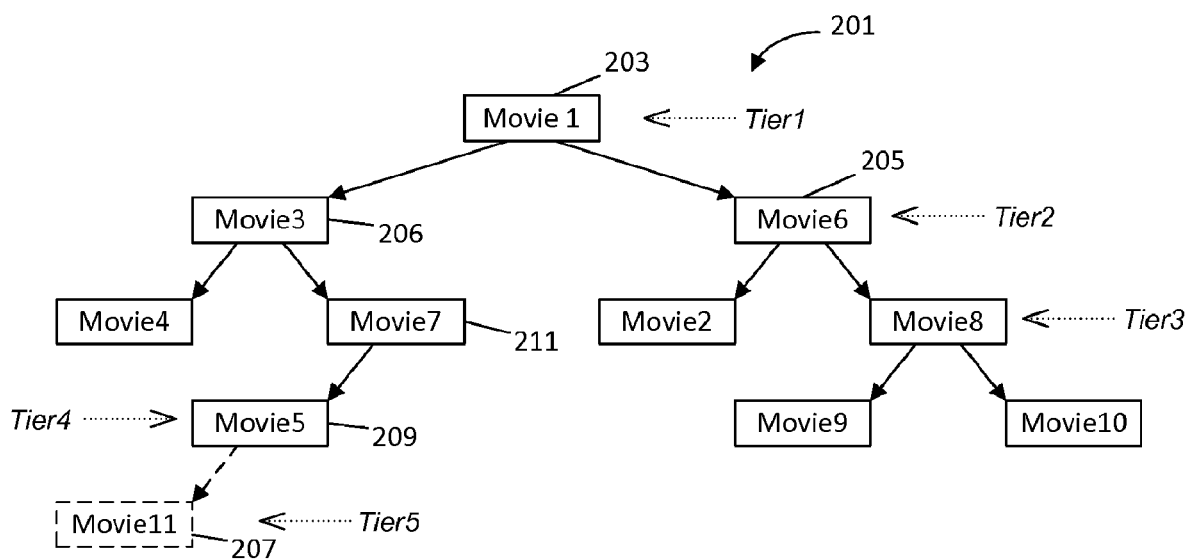
FIG. 2A shows a binary tree used to explain extracting an individual's preferences for various movies.

FIGS. 2A and 2B are used to present one example of a height-balanced tree and its use in collecting preference data between members of a set. In the particular example represented by FIGS. 2A and 2B, it is assumed that preference data is to be collected relating to an individual's or group's taste in movies. It should be assumed that there are 10 movies that have already been the subject of elicited preference data, and that an individual is to be queried as to how the individual likes an $11^{th}$ movie relative to these 10 movies already considered. The tree 201 depicted in FIGS. 2A and 2B represents one iteration of building a tree that can consist of many more movies (e.g., it may be that the $11^{th}$ movie is the $11^{th}$ of 30 movies for which relative preference data is being collected). Alternatively, it could be that the $11^{th}$ movie represents a newly available choice, and that this choice is being added to a preexisting set of 10 movies. Either way, a user is queried in a manner where all 11 movies will scored relative to one another.

With reference to FIG. 2A, the tree 201 is seen to be a binary tree representing already-received preference data. The tree 201 has four tiers, with a root node (203) at a first tier ("tier 1") and with other nodes organized into tiers 2, 3 and 4. In the depicted example, movies 4, 5, 2, 9 and 10 are seen to represent leaf nodes, while movies 3, 7, 6 and 9 represent intermediate nodes. In this example, a right branch direction from a parent node indicates that all child nodes stemming from the branch segment are preferred to the parent according to previously-received preference data, while a left branch indicates that the parent node is preferred to any child node branched from the left of the parent. For example, according to the tree seen in FIG. 2A, movies 6, 2, 8, 9 and 10 are each depicted as preferred to movie 1 whereas movies 1, 6, 2, 8, 9 and 10 are preferred to any of movies 3, 4, 7 and 5, and so on.

As an example of the process for extracting preference data, an individual is first asked (e.g., via the web page process referenced above) to express a preference between the incremental movie not yet in the tree (i.e., "movie 11") and the root node, "movie 1." This comparison between members of a subset (movies 1 and 11) yields a first result. In a subsequent comparison, the system proceeds to nodes 205 or 206 depending on this first result. For example, in an attempt to position "movie 11" within the depicted tree, if the individual prefers movie 11 to movie 1, the next comparison is between movie 11 and movie 6 (node 205); alternatively, if movie 1 is preferred, the next comparison is between movie 11 and movie3 (node 206). If it is assumed that in successive iterations, the polled individual preferred movie 1 (node 203) to movie 11, movie 11 to movie 3 (node 206), movie 7 (node 211) to movie 11, and movie 5 (node 209) to movie 11, then movie 11 would be placed as a new leaf node 207 in the tree structure. Note that in the depicted example, this creates a new tier ("tier5") of the tree structure, immediately below the former leaf node 209. It should be apparent that given the tree structure, this placement results in an expression of ordered preference of all 11 movies, with precise ordering for movie 11 even though only four comparisons were in fact performed. Depending on how the addition of a new node changes the tree structure, it may be desired to rebalance the tree. While this rebalancing does not necessarily have to be performed with each iteration, in one embodiment, each time a new leaf node is added, the tree is checked for violation of tree rules (i.e., height balancing rules) and a subroutine is called to correct any violations as appropriate.

If this $11^{th}$ movie was the last member of the set to be considered, scoring might then be performed as appropriate for all members of the set. Note that, as referenced earlier, all members of the set might be placed in the tree structure and ordered without a like number of comparisons for each node, e.g., it is possible for some nodes to have experienced many comparisons and some nodes to have been subject to only a relatively small number of comparisons. To this end, in one embodiment, all positive and negative votes are tracked for each member of the set during the tree building process. For the example just given, the addition of movie 11 would contribute 1 "yes" vote for each of movies 1, 5 and 7, one "yes" vote and three "no" votes for movie 11, and one "no" vote for movie 3. These votes would be accumulated with respective "yes" and "no" votes associated with other additions to the tree and tallied once the tree has been completed (i.e., to represent all members of the set under consideration). In this manner, nodes that are assessed frequently in voting are weighted more heavily, even if ultimately unselected (i.e., not preferred). Other scoring methodologies may also be used.

As should be apparent, the addition of movie 11 as a new leaf node in FIG. 2A creates a $5^{th}$ tier of the tree. Thus, as an ensuing choice is compared against this tree, it might be necessary to perform a disproportionate number of comparisons to add the ensuing choice to the tree (e.g., should a $12^{th}$ movie be added as a leaf node stemming from node 207, five comparisons would be needed for this placement). According to one exemplary process, therefore, each time a new leaf node is added to the tree, the modified tree is assessed and height balanced as appropriate. Typically, the effect of height rebalancing is to rotate some branches of the tree or the entire tree itself (i.e., thereby changing the root node to become a different node).

FIG. 2B helps illustrate this process. In FIG. 2B, the tree is once again generally designed using numeral 201 and the root node is designated 203. However, the tree has now been height-rebalanced as depicted by rotation icon 208. This is to say, it should be assumed that the structure depicted in FIG. 2A as modified by the addition of "movie 11" as new node 207 has been tested and determined to violate predetermined criteria for height balance. Accordingly, the structure seen in FIG. 2A is therefore further modified to effectively flatten and redistribute tree height for use in subsequent comparisons. Note that while all 11 movies are still represented in the tree structure, this process results in the presentation of the tree as having at most four tiers (i.e., tiers 1-4 as depicted in FIG. 2B). Note that the tree has been modified to change its representation without effectively changing the information conveyed by the tree, to wit, that "movie11" is preferred to movies 3 and 4, but is less preferred than movies 1-2 and 5-10. That is, only the tree representation of the relative preference information has changed, not the preference information itself. The rebalancing of the tree helps minimize the additional preference data needed to reconcile further additions to the tree with the existing tree structure.

Note that the rotation of all or part of a tree helps redistribute height even where red-black rules are not used for height balancing.

Figure 3Q:
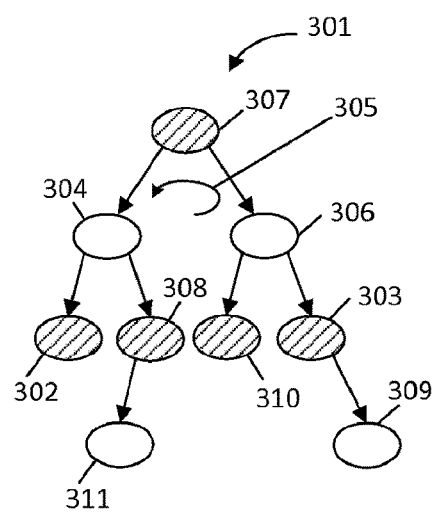

FIGS. 3A-3Q will be used to describe the incremental building of a tree 301 according to red-black tree rules. It is emphasized that the use of red-black trees represent only one exemplary embodiment, and that other trees and/or other tree manipulation principles are used in other embodiments.

As mentioned earlier, the specific red-black methodology used herein features several rules used to maintain height-balance as a binary tree is constructed. As each new leaf node is added to the binary tree, the tree is tested to ensure compliance with the rules. For the embodiment of FIGS. 3A-Q, a tree is determined to be out of conformance if any of the following is true:
(a) there exists a different number of black nodes in one branch path from root-to-leaf than in any other root-to-leaf branch path; or (b) the tree features two consecutive red nodes in sequence in any branch path from root-to-leaf; or (c) the root node is red.

If any of these rules are violated, a tree balancing procedure (e.g., subroutine) is called to change the graphic representation of the tree and to restore balance. Note that when building the tree, a new leaf node is always colored red by default, and there are no more than two child nodes to any parent. If following this addition, the aforementioned rules are violated, the correction process performs recoloration, followed by node rotation (and change in child node dependence, as appropriate). Compliance with the aforementioned rules is then reassessed, and processing repeated as necessary until compliance is achieved. The following principles are generally employed: First, black nodes are moved as high in the tree as possible during recoloration, while preserving the requirements that there must be an equal number of black nodes in each branch sequence and that there cannot be two consecutive red nodes in sequence. Second, if addition of a leaf node results in two red nodes in sequence, these nodes are pushed as far up the tree as possible during recoloration while maintaining the principles that (1) there be an equal number of black nodes in each root-to-leaf branch alternative and (2) the root node remains black. Once adjacent red nodes have been moved up as far as possible, these red nodes are rotated as far as possible in a clockwise direction within the affected branch before performing any rotation through a parent node. It is noted that because rotation reallocates nodes across affected branches, this invariably will permit rebalance of the tree in a manner that satisfies the rules mentioned above, following recoloration. Finally, a red node may always be recolored as a black node as long as doing so does not violate the other listed rules. These principles will be exemplified in the series of steps discussed below, designed to illustrate red-black tree manipulation.

For purposes of discussion, it should be assumed that there are nine members of a set, and that it is desired to obtain preference data for all nine members of the set. It should be assumed that none of these members have yet been evaluated and that all members are to be evaluated by a single individual. As seen in FIG. 3A, in a first incremental step of building a tree, a first member is selected and placed in the tree 301 as a first node 302. Being that this node is the only node of the tree, it is the root node and it is colored black (as represented by a hatched-fill).

In FIG. 3B, a second member of the set is to be evaluated against the first member represented as the root node 302. A subset consisting of these members of the set is presented to the individual for purposes of pairwise comparison. It is assumed that the individual indicates a preference for the new member over the member corresponding to the root node 302; a node representing the new member is accordingly placed in the tree to the right of node 302 as a new "red" leaf node 303. This structure does not violate any of the exemplary red-black tree rules, and hence the tree is not rebalanced.

In FIG. 3C, a third member of the set is evaluated against the existing tree. In a first iteration of this evaluation, it is found that the new member is preferred to the first member (represented as black node 302); in a second iteration, it is found that the second member (represented by red node 303) is preferred to this third member. Accordingly, the third member is placed to the left of red node 303 and is likewise colored as a red node. This coloration offends the mentioned red-black tree rules because two red nodes are not allowed to exist in sequence.

Accordingly, the tree 301 is first processed to push the two successive red nodes as far up the tree as possible. As the first rule is that the root node 302 must always be black, it is impossible to move the two successive red nodes further toward the root node. Next, the red nodes (and any child nodes) are rotated clockwise as far as possible. This is depicted in FIG. 3D as referenced by the rotation graphic 305, showing clockwise rotation of the second and third nodes, 303 and 304. Note that node 303 now depends from node 304, instead of vice-versa (as seen in FIG. 3C). However, despite this transformation, the tree 301 still represents the same preference data, that is, node 303 >node 304 >node 302, in order of preference. Because this structure still violates the red-black rules selected for this embodiment, the tree is next processed to rotate the two red nodes through the parent node 302 in a counterclockwise direction. This rotation is depicted in FIG. 3E, once again using numeral 305. Note that this operation changes the root node from node 302 to node 304, and that following rotation, the tree 301 has a different number of black nodes in each path from the new root node 304. However since a red node may always be recolored as black as long as this does not violate one of the rules (i.e., the requirement of equal black nodes in each root-to-leaf path), this problem can be resolved by recoloring node 302 as red, as seen in FIG. 3F. Note that relative to FIG. 3C, the same data is now represented as a balanced, 2-tier binary tree instead of the 3-tier tree of FIG. 3C, and that in both cases, the representations convey exactly the same information, i.e., node 303 >node 304 >node 302 in terms of relative preference. As another member of the set is subsequently added to this tree on an incremental basis, positioning of that new member as a leaf node will require at most two iterations.

In FIG. 3G, it is assumed that a new fourth member of the set is to be added to the tree 301, and that this new member is preferred to member corresponding to node 304 but not the member corresponding to node 303. This fourth member is added as a new "red" node 306, and the modified tree is again tested to ascertain compliance with the mentioned red-black tree rules. As two red nodes are now in sequence in the right branch path, and as this offends one of the rules for red-black trees used for this specific embodiment, a height-rebalancing process is one again invoked. In this instance, however, the issue can be resolved by recoloring the nodes 302 and 304 as black, as now depicted in FIG. 3H. That is, a red node can always be recolored as black as long as doing so does not violate the requirement that an equal number of black nodes be represented in each path. Following this recoloration, the tree 301 once again satisfies the criteria associated with a balanced tree, and the process then proceeds to consideration of the next unconsidered of the set.

In FIG. 3I, the next member has been added through a number of comparison iterations, i.e., to determine that the individual prefers a fifth member of the set to the member represented at node 304, but not to the members represented at nodes 303 or 306. Once again, this results in two red nodes in a row, requiring rebalancing of the tree. Accordingly, the node representing the new member 307 and node 306 are first rotated clockwise, such that node 306 depends from node 307; then, these nodes and their parent node (node 303) are rotated, in this case in the clockwise direction, such that node 306 is the new parent. Because node 303 is black and this black coloration can be moved higher in the tree without offending other rules, node 306 is then recolored as black and node 303 is recolored as red. The final result is seen in FIG. 3J, accompanied by the rotation icon 305 to show the effect on the presentation of nodes 307, 306 and 303, relative to FIG. 3I. Note that once again, while the tree now satisfies the expressed red-black rules, the same preference data is still equivalently represented by FIG. 3J, e.g., node 303 >node 306 >node 307 in relative preference. Because there is an equal number of black nodes in each path and the other rules are satisfied, no further recoloration need be performed.

In FIG. 3K, the next member of the set has been compared to the tree and added as a new red leaf node 308. The tree is then once again tested for height-balance, and it is determined that two red nodes are again presented in sequence. However, in this case, a height-balancing subroutine can re-establish conformance with red-black rules simply by recoloring nodes 307 and 303 as black and node 303 as red. A tree revised in this manner is then stored for use in eliciting preference data for other members of the set.

In FIG. 3L, the next member of the set is compared with a sequence of nodes describing a single branch path; the new tree member is assumed to be preferred to the members represented by nodes 304, 306 and 303, and is consequently added as a new red node as indicated by numeral 309. During testing for compliance with red-black rules, it is determined that the modified tree does not violate any red-black tree criteria. Accordingly, a tree-balancing subroutine is not invoked, and the modified tree and collected preference data (votes) are stored.

FIG. 3M represents the next incremental process, which results in the hypothetical placement of another member as node 310. Once again, this does not violate any of the mentioned rules for tree height, and a balancing process is not required.

FIG. 3N represents the addition of a ninth member of the set, as node 311, depending from node 308. Note that this once again violates the mentioned-red-black rules, as there are now two red nodes in sequence. According, rebalancing is required and results in the operations depicted in FIGS. 3O, 3P and 3Q. First, the two red nodes are moves as high as possible in the tree structure; this results in coloration of nodes 308 and 310 as black nodes and the coloration of node 307 as a red node, as depicted in FIG. 3O. However, the presence of two successive red nodes 306 and 307 still violates the red-black tree rules. Note that these red nodes cannot be moved higher in the tree without violating the requirement that the root node be colored black. As these red nodes can be rotated to the right, both they and all of their dependent nodes are rotated clockwise, as once again referenced by rotation graphic 305. Note that there cannot be more than two child nodes for any parent according to the rules presented above. In this case, the member corresponding to node 310 was preferred to the member corresponding to node 307 but not to the member corresponding to node 306. As simple clockwise rotation of nodes 307 and 306 would place 3 dependencies from node 307, node 310 is instead moved to depend from node 306, i.e., still representing the relative preference of node 310 to node 307 but not to node 306. The resultant structure is depicted in FIG. 3P. However, this structure still represents a tree that has two successive red nodes that cannot be addressed through recoloration. As a consequence, the two red nodes are then rotated through their parent node (node 304) which changes the root node of the tree to become node 307. With this change, recoloration can be applied to once again bring the tree into conformance with the mentioned red-black rules, i.e., node 307 is recolored black and node 304 is recolored red. The resultant tree, seen in FIG. 3Q, is thus once again height-balanced and its representation is stored in memory for use in consideration of any additional set members.

It is once again noted that the red-black rules just discussed represent only one specific implementation of a height-balanced tree. As should be apparent, "height-balancing" in this context does not require that each possible branch have an equal height, but merely that some process is employed to keep one branch path from getting "too long" relative to other branch paths. For example, the specific red-black rules just discussed will ensure that no branch path is more than twice as long (in terms of total traversed nodes) than any other. Other forms of height balancing may be employed, whether applied to binary trees or otherwise.

With a detailed example of height-balancing thus presented, some examples of scoring and presentation will now be introduced.

IV. Scoring of Results.

As noted earlier, the use of a height-balanced tree helps ensure that every member of a set under consideration can be ordered relative to every other member of the overall set using a reduced number of preference comparisons. Once the tree-building process is complete (i.e., and preference data has been obtained for all members of the overall set), the members of the set are scored according to the obtained preference data, as appropriate for any voting, recommendation, polling, rating, or other application. FIG. 4 is used to represent this in the form of a block diagram, generally designated numeral 401; numeral 403 represents the use of a height-balanced tree, as referenced, while numeral 405 represents the scoring process. The various scores can be stored in digital memory (not depicted in FIG. 4). With each member scored, the members can be sorted according to score, e.g., highest-to-lowest. This is represented by numeral 407. A result can then be optionally displayed representing any number of members of the set, e.g., at least one member (e.g., "the winner") or multiple members as a comparative result. For example, in one embodiment, software simply displays these results to the individual being polled or to an administrator. In a network-based application (e.g., in connection with a network service), a specific display page can be formatted (e.g., as an HTML document) and transmitted to a remote computer for display, as depicted by dashed-line (optional) function block 409.

In one embodiment, both positive preference data (e.g., "yes" votes) and negative preference data (e.g., "no" votes) are respectively tallied from all comparisons in building a tree and are tracked for each member. This optional scoring step is represented by numeral 411 in FIG. 4. Other options also exist for aggregating preference data, but it is believed this operation provides a simple yet robust mechanism that provides a basis for fairly weighting each of the members of a set. In a specific embodiment, a Wilson's score can then be calculated based on these aggregated yes votes and no votes for each member of the overall set. One example of a Wilson's scoring methodology is provided by the equation below, where "Y" represents the number of "yes" votes tallied for a given member of the set, and "N" represents the number of "no" votes tallied for the given member of the set.

$$\text{Score} = \frac{(Y + 1.9208 - (1.96 \times \sqrt{0.9605 + ((Y \times N)/(Y + N))}))}{(Y + N + 3.8416)}$$

As should be apparent, many other possible mathematical measures are possible for computing scores based on collected preference data. In the context of the embodiment of FIG. 4, a numerical measure is computed for each member of the set and then, as alluded to by function blocks 407 and 408, the scored members can then be sorted and applied to the desired application. For example, in a polling application, the top score-recipient or a set of the n-most top score recipients can be displayed. Alternatively, scores can be converted to a probability estimate, with one or more of these estimates displayed to indicate likelihood of outcome.

FIG. 4 also references group versus individual calculation options, introduced earlier. For example, per numeral 415, a height-balanced, binary tree can be used for each individual (e.g., of a group) to elicit preference data (and associated scores) using a reduced number of computation iterations. Alternatively, a binary tree can be computed based on iterations directed to respective, different subsets of individuals within a group. As an example, if a hypothetical set consists of 20 members and if it is desired to score preferences of a group of 30 individuals, different combinations of individuals (e.g., 15 individuals at a time) could be asked to place incremental members of the set within a binary tree, using the principles introduced earlier—to heighten confidence in accuracy of the result, the specific permutation of 15 individuals could be varied for each new member comparison (and/or for each iteration of comparing the new member with different nodes), with the individuals selected in a random manner Naturally, these examples are non-limiting and are used simply to introduce the wide range of implementation variations. As referenced by dashed-line block 419, if multiple trees are used for respective individuals (or groups of individuals), these trees can be scored and then combined or the underlying preference data can first be combined and then scored.

V. A Hypothetical Practical Application.

FIGS. 5A and 5B are used to provide one hypothetical application example, with both polling and results expressed in the form of web pages. More specifically, FIGS. 5A and 5B represent an example where a sports television network wishes to poll popular opinion as to which game to air on a hypothetical date of October 19. It is noted that there are well over 100 NCAA FBS (division 1) college football teams in the United States, with about 13 games involving top-25 teams set for play on October 19. In this example, it is assumed that a television network wishes to take an Internet poll to determine which game or games to air on October 19.

Applying the principles introduced earlier, the television network (or a third party service provider) could invite a predetermined group of individuals (such as visitors to a website) to take a poll. As part of the poll, a first one of the 13 top-25 matchups would be assigned as a root node, and each individual would then be asked pairwise iteratively to compare subsets of the 13 games, beginning with a comparison between a second one of the top-25 teams and a node from a tree formed by matchups already processed. FIG. 5A shows one rudimentary example of a webpage 501 that solicits the preference of an individual being polled; depending on the entry checked by the individual, the webpage 501 would then be refreshed to request an ensuing comparison depending on the choice selected in the prior round. The poll would end once all 13 matches had been considered according to a height-balanced binary tree. While in this example there would be 78 permutations of pairwise comparisons that could be performed to obtain complete preference data between games, through the use of a height-balanced tree to control the presentation of pairwise comparisons, preference data across the entire field of games could be elicited using a much smaller number of comparisons. By eliciting preferences among 3 candidate matches at a time, or by asking different combinations of individuals to indicate preference for each subset of the available matches, the polling process can be streamlined further. Once sufficient preference data was elicited for all available matches, the poll would end with scoring of available matches. FIG. 5B shows a sample results page 551 that shows hypothetical scoring once polling is completed (e.g., for a specific group of individuals, e.g., poll participants to-date). This page 551 represents scoring of all 13 matches, e.g., using a Wilson's score formula as introduced earlier, but with only the top five results displayed. Completing this hypothetical, a television network could monitor results and use the results to select one or more matchups to air in a specific time slot.

Note again that this hypothetical example represents merely one possible application. That is, nearly any set of candidate choices can be processed using the techniques described above, with nearly any desired usage made of data once members are scored according to preference data. For example, the mentioned techniques can be applied to prediction markets, polling, voting, gaming, gambling, and many other types of applications.

In the description above, some or all of the functions described can also be embodied as instructions stored on non-transitory machine-readable media, including software code or firmware that, when executed, cause a machine (e.g. a microprocessor or device having a microprocessor) to perform functions described by these instructions. Such media can typically be any form of machine-readable media capable of storing a signal, whether magnetic, optical, electronic, etc., with common examples being dynamic random access memory (DRAM), a computer readable disk, server memory, a flash card, a compact disk, network memory and so forth. Also, any such instructions can be alternatively implemented as hardware logic, or a combination of hardware and software logic, depending on implementation.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim the following:

1. A method of scoring members of a set relative to one another, wherein the members of the set include first members and second members, the method comprising:
(a) receiving, from individuals in a group, relative preference data for the first members and not for the second members;
(b) organizing the first members into a plurality of tree structures, wherein each tree structure corresponds to the relative preference data of an individual, and each first member is positioned as a node of the tree structure;
(c) for each individual in the group:

(i) receiving a plurality of the second members;
(ii) selecting a second member from the plurality of the second members;
(iii) eliciting, from the individual, a preference between the selected second member and a first member of a tree structure of the individual to determine relative preference data between the first member and the selected second member, wherein in a first iteration the first member is a root node of the tree structure of the individual;
(iv) when the first member is preferred over the selected second member, choosing a node to the left of the first member for a next iteration for comparison with the selected second member;
(v) when the selected second member is preferred over the first member, choosing a node to the right of the first member for a next iteration for comparison with the selected second member;
(vi) following a path through the tree structure of the individual and repeating steps (iii)-(v) until the selected second member is positioned as a node of the tree structure according to the elicited relative preference data;
(d) repeating steps (ii)-(vi) for another second member;
(e) assigning a score to each member of each tree structure of each individual based on a number of times each member was preferred or not preferred in the elicited relative preference data; and
(f) transmitting, to a remote digital device, the scores of each member of each tree structure of each individual.

2. The method of claim 1, further comprising building a group score for each member of the set by combining the score corresponding to each member of all individuals in the group.

3. The method of claim 1, implemented on one or more network servers, wherein iteratively eliciting relative preference data between the first member and the selected second member comprises generating a browser-displayable page for presentation to the individual via a digital device associated with the individual, and the browser-displayable page visually presents to the individual the first member and the selected second member and responsively receives input from the individual of the relative preference data between the first member and the selected second member.

4. The method of claim 1, further comprising height-balancing the tree structure of the individual when the tree structure is height-unbalanced.

5. The method of claim 4, wherein the tree structure of the individual comprises a red-black tree structure, and wherein height-balancing the tree structure comprises recoloring at least one node of the red-black tree structure.

6. The method of claim 4, wherein height-balancing the tree structure of the individual comprises rotating the tree structure of the individual and, in so doing, changing the root node of the tree structure of the individual.

7. The method of claim 1, wherein the selected second member is scored relative to all members of the set using a number of pairwise comparisons that is no more than approximately the binary logarithm of a total number of the first members in the set.

8. The method of claim 1, wherein a browser-displayable page visually presents the scores for at least two member of the set.

9. The method of claim 8, wherein the browser-displayable page is transmitted to the remote digital device only upon verification of a valid subscription associated with a user of the remote digital device.

10. An apparatus, comprising:
a processor,
a memory unit, and
instructions stored on non-transitory machine-readable media, the instructions adapted when executed to cause at least one machine to score members of a set relative to one another, wherein the members of the set include first members and second members, the instructions adapted when executed to cause the at least one machine to:
(a) receive, from individuals in a group, relative preference data for the first members and not for the second members;
(b) organize the first members into a plurality of tree structures, wherein each tree structure correspond to the relative preference data of an individual, and each first member is positioned as a node of the tree structure;
(c) for each individual in the group
(i) receive a plurality of the second members;
(ii) select a second member form the plurality of the second members;
(iii) elicit from the individual, a preference between the selected second member and a first member of a tree structure of the individual to determine relative preference data between the first member and the selected second member, wherein in a first iteration the first member is a root node of the tree structure of the individual;
(iv) when the first member is preferred over the selected second member, choose a node to the left of the first member for a next iteration for comparison with the selected second member;
(v) when the selected second member is preferred over the first member, choosing a node to the right of the first member for a next iteration for comparison with the second member;
(vi) following a path through the tree structure of the individual and repeating steps (iii)-(v) until the selected second member is positioned as a node of the tree structure according to the elicited relative preference data;
(d) repeat steps (ii)-(vi) for another second member;
(e) assign a score to each member of each tree structure of each individual based on a number of times each member was preferred or not preferred in the elicited relative preference data; and
(f) transmit, to a remote digital device, the scores of each member of each tree structure of each individual.

11. The apparatus of claim 10, wherein the instructions when executed are adapted to further cause the at least one machine to, build a group score for each member of the set by combining the score corresponding to each member of all individuals in the group.

12. The apparatus of claim 10, wherein the instructions when executed are adapted to further cause the at least one machine to, generate a browser-displayable page for presentation to the individual via a computer associated with the individual, and the browser-displayable page visually presents the first member and the selected second member and responsively receives input from the individual of the relative preference data between the first member and the selected second member.

13. The apparatus of claim 10, wherein the instructions when executed are adapted to further cause the at least one machine to height-balance the tree structure of the individual when height-unbalanced.

14. The apparatus of claim 13, wherein the instructions are adapted to, when executed, further cause the at least one machine to perform as part of the height-balancing of the tree structure, rotating of the tree structure of the individual and, in so doing, changing of the root node of the tree structure of the individual.

15. The apparatus of claim 10, wherein the tree structure of the individual comprises a red-black tree structure, and wherein the instructions are adapted to, when executed, further cause the at least one machine to recolor at least one node of the red-black tree structure.

16. The apparatus of claim 10, wherein a browser-displayable page visually presents the scores for at least two member of the set.

17. The apparatus of claim 16, wherein the browser-displayable page is transmitted to the remote digital device only upon verification of a valid subscription associated with a user of the remote digital device.

18. An apparatus to score members of a set relative to one another, wherein the members of the set include first members and second members the apparatus comprising a computer, comprising a processor and a memory, adapted to perform,
  (a) receiving, from individuals in a group, relative preference data for the first members and not for the second members;
  (b) organizing the first members into a plurality of tree structures, wherein each tree structure corresponds to the relative preference data of an individual, and each first member is positioned as a node of the tree structure;
  (c) for each individual in the group:
    (i) receiving a plurality of the second members;
    (ii) selecting a second member from the plurality of the second members;
    (iii) eliciting, from the individual, a preference between the selected second member and a first member of a tree structure of the individual to determine relative preference data between the first member and the selected second member, wherein in a first iteration the first member is a root node of the tree structure of the individual;
    (iv) when the first member is preferred over the selected second member, choosing a node to the left of the first member for a next iteration for comparison with the selected second member;
    (v) when the selected second member is preferred over the first member, choosing a node to the right of the first member for a next iteration for comparison with the selected second member;
    (vi) following a path through the tree structure of the individual and repeating steps (iii)-(v) until the selected second member is positioned as a node of the tree structure according to the elicited relative preference data;
  (d) repeating steps (ii)-(vi) for another second member;
  (e) assigning a score to each member of each tree structure of each individual based on a number of times each member was preferred or not preferred in the elicited relative preference data; and
  (f) transmitting, to a remote digital device, the scores of each member of each tree structure of each individual.

19. The apparatus of claim 18, wherein a browser-displayable page visually presents the scores for at least two members of the set.

20. The apparatus of claim 19, wherein the browser-displayable page is transmitted to the remote digital device only upon verification of a valid subscription associated with a user of the remote digital device.

* * * * *